(12) United States Patent
Wiebe et al.

(10) Patent No.: US 10,699,208 B2
(45) Date of Patent: Jun. 30, 2020

(54) METHOD AND SYSTEM FOR COMPUTING DISTANCE MEASURES ON A QUANTUM COMPUTER

(71) Applicant: Microsoft Technology Licensing, LLC, Redmond, WA (US)

(72) Inventors: Nathan Wiebe, Redmond, WA (US); Krysta Svore, Seattle, WA (US); Ashish Kapoor, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 15/101,888

(22) PCT Filed: Dec. 5, 2014

(86) PCT No.: PCT/US2014/068830
§ 371 (c)(1),
(2) Date: Jun. 3, 2016

(87) PCT Pub. No.: WO2015/085190
PCT Pub. Date: Jun. 11, 2015

(65) Prior Publication Data
US 2016/0314406 A1 Oct. 27, 2016

Related U.S. Application Data

(60) Provisional application No. 61/912,450, filed on Dec. 5, 2013.

(51) Int. Cl.
*G06N 99/00* (2019.01)
*G06F 9/445* (2018.01)
(Continued)

(52) U.S. Cl.
CPC ......... *G06N 10/00* (2019.01); *G06F 9/44505* (2013.01); *B82Y 10/00* (2013.01)

(58) Field of Classification Search
CPC .................................................. G06N 99/002
See application file for complete search history.

(56) References Cited

U.S. PATENT DOCUMENTS 5,937,093 A * 8/1999 Takahashi ............ G06K 9/6276
382/195
7,640,219 B2 * 12/2009 Perrizo ................ G06K 9/6276
706/20

(Continued)

FOREIGN PATENT DOCUMENTS

CN 1755715 A 4/2006

OTHER PUBLICATIONS

Durr et al. "A Quantum Algorithm for Finding the Minimum" arXiv:quant-ph/9607014, Jul. 1996.*
(Continued)

*Primary Examiner* — Manuel L Barbee
(74) *Attorney, Agent, or Firm* — Klarquist Sparkman, LLP

(57) ABSTRACT

Nearest neighbor distances are obtained by coherent majority voting based on a plurality of available distance estimates produced using amplitude estimation without measurement in a quantum computer. In some examples, distances are Euclidean distances or are based on inner products of a target vector with vectors from a training set of vectors. Distances such as mean square distances and distances from a data centroid can also be obtained.

21 Claims, 10 Drawing Sheets

(51) Int. Cl.
 B82Y 10/00 (2011.01)
 G06N 10/00 (2019.01)

(56) References Cited

U.S. PATENT DOCUMENTS

| | | | |
|---|---|---|---|
| 8,266,121 B2 | 9/2012 | Roitblat et al. | |
| 2003/0121028 A1 | 6/2003 | Coury et al. | |
| 2006/0123363 A1 | 6/2006 | Williams et al. | |
| 2010/0119141 A1 | 5/2010 | Weinstein et al. | |
| 2013/0057314 A1* | 3/2013 | Wu | B82Y 10/00 326/3 |
| 2013/0096698 A1* | 4/2013 | Ulyanov | G05B 13/0295 700/30 |

OTHER PUBLICATIONS

Durr et al. "A Quantum Algorithm for Finding the Minimum" arXiv:uant-ph/9607014, Jul. 1996.*
Saeedi et al. "Synthesis of Quantum Circuits for Linear Nearest Neighbor Architectures", published Oct. 19, 2010, Quantum Information Processing, Jun. 2011, vol. 10, Issue 3, pp. 355-377.*
Franco, Riccardo. "Quantum Amplitude Amplification Algorithm: An explanation of Availability Bias", Proceedings Third International Symposium, Quantum Interaction, 2009, ages 84-96.*
Aharonov et al., "Adiabatic Quantum State Generation and Statistical Zero Knowledge," Proceedings of the Thirty-Fifth Annual ACM Symposium on Theory of Computing, 35 pages (Jul. 1, 2003).
Brassard et al., "Quantum Amplitude Amplification and Estimation," arXiv preprint quant-ph/0005055, 32 pages (May 2, 2000).
Buhrman et al., "Quantum Fingerprinting," aarXiv:quant-ph/0102001, 8 pages (Feb. 1, 2001).
Childs et al., "Exponential Algorithmic Speedup by a Quantum Walk," Proceedings of the Thirty-Fifth Annual ACM Symposium on Theory of Computing, 24 pages (Jun. 9, 2003).
Childs et al., "Hamiltonian Simulation using Linear Combinations of Unitary Operations," Proceeding of the Bulletin of the American Physical Society, 18 pages (Feb. 2, 2012).
Dong et al., "Quantum Reinforcement Learning," *IEEE Transactions on Systems, Man, and Cybernetics, Part B: Cybernetics*, 38:1-13 (Oct. 2008).
Durr et at., "A Quantum Algorithm for Finding the Minimum," arXiv:quant-ph/9607014, 2 pages (Jul. 1996).

Gambs, "Quantum Classification," available at: http://arxiv.org/pdf/0809.0444.pdf, 21 pages (Sep. 2, 2008).
International Preliminary Report on Patentability from International Application No. PCT/US2014/068830, dated Apr. 12, 2016, 19 pages.
International Search Report and Written Opinion from International Application No. PCT/US2014/068830, dated Jul. 9, 2015, 13 pages.
Khan, "Cost Reduction in Nearest Neighbour Based Synthesis of Quantum Boolean Circuits," *Engineering Letters*, 16, 5 pages (Feb. 2008).
Krahn, "Quantum Computation and Grover's Algorithm," retrieved on Nov. 12, 2013, available at: http://math.uchicago.edu/~may/REU2012/REUPapers/Krahn.pdf, 16 pages.
Lloyd, "Quantum Algorithms for Supervised and Unsupervised Machine Learning," arXiv preprint arXiv:1307.0411, 11 pages (Nov. 4, 2013).
"Machine Learning," retrieved on Nov. 12, 2013, available at: http://cseweb.ucsd.edu/~dasgupta/103/7.pdf, 7 pages.
Neven, "Machine Learning with Quantum Algorithms," available at: http://googleresearch.blogspot.in/2009/12/machine-learning-with-quantum.html, 2 pages (Dec. 8, 2009).
Rebentrost et al., "Quantum Support Vector Machine for Big Feature and Big Data Classification," arXiv preprint arXiv:1307.0471, 5 pages (Jul. 1, 2013).
Shafaei et al., "Optimization of Quantum Circuits for Interaction Distance in Linear Nearest Neighbor Architectures," Proceedings of the 50th Annual Design Automation Conference, 6 pages (May 29, 2013).
Wiebe et al., "Simulating Quantum Dynamics on a Quantum Computer," *Journal of Physics A: Mathematical and Theoretical*, 21 pages. (May 27, 2011).
Written Opinion of the International Preliminary Examining Authority from International Application No. PCT/US2014/068830, dated Jan. 7, 2016, 8 pages.
Yao et al., "Quantum Clustering Algorithm based on Exponent Measuring Distance," IEEE International Symposium on Knowledge Acquisition and Modeling Workshop, 4 pages (Dec. 21, 2008).
Zhu, "K-nearest-Neighbor: An Introduction to Machine Learning," available at: http://www.cs.sun.ac.za/~kroon/courses/machine_learning/lecture2/kNN-intro_to_ML.pdf, 24 pages (Nov. 12, 2013).
Office Action issued in Chinese Patent Application No. 201480066425.0, dated Feb. 9, 2018, 9 pages.

* cited by examiner

METHOD AND SYSTEM FOR COMPUTING DISTANCE MEASURES ON A QUANTUM COMPUTER

CROSS REFERENCE TO RELATED APPLICATIONS

This is the U.S. National Stage of International Application No. PCT/US2014/068830, filed Dec. 5, 2014, which was published in English under PCT Article 21(2), which in turn claims the benefit of U.S. Provisional Application No. 61/912,450, filed Dec. 5, 2013.

FIELD

The disclosure pertains to estimating distances with quantum computers.

BACKGROUND

Nearest neighbor classification can be used to solve real world problems such as determining whether a handwritten number is even or odd, or whether a handwritten marking is a letter, a number, a lower case letter, an uppercase letter, or other symbol. Conventional computation methods for performing such classifications tend to require large numbers of processing steps. Quantum computing methods can permit more rapid solution of some conventional computational problems such as searching and factorization. Quantum computing methods for classification have been based on mean data values. In many practical examples, mean data values are not suitable, especially if data values have irregular or complex distributions. For example, in many practical applications, success probabilities of only about 50% are obtained with mean value based methods, rendering such methods no more reliable than flipping a coin. Improved methods for classification using quantum computers are needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosed methods and apparatus address problems associated with clustering, classification, and distance measure computations on a quantum computer. The disclosed approaches can provide end-to-end solutions in which such computations are performed with a quantum computer. In addition, decision problems can be solved using a number of queries to a quantum oracle that is not explicitly dependent on the number of features in a feature vector. The disclosed approaches also are suitable for a wider range of applications than conventional methods. Quantum computing methods permit determination of inner products and Euclidean distances between elements of data sets. A nearest neighbor to a particular data point can be determined, wherein the neighbor distance is based on a Euclidean distance or an inner product of vectors defined by the data points. In addition, data values can be assigned to one or more data sets corresponding to a nearest cluster of data points. Distances are obtained based on amplitude estimation without measurement, and a median value of a plurality of values is selected.

The foregoing and other features, and advantages of the disclosed technology will become more apparent from the following detailed description, which proceeds with reference to the accompanying figures.

DETAILED DESCRIPTION

Figure 1:
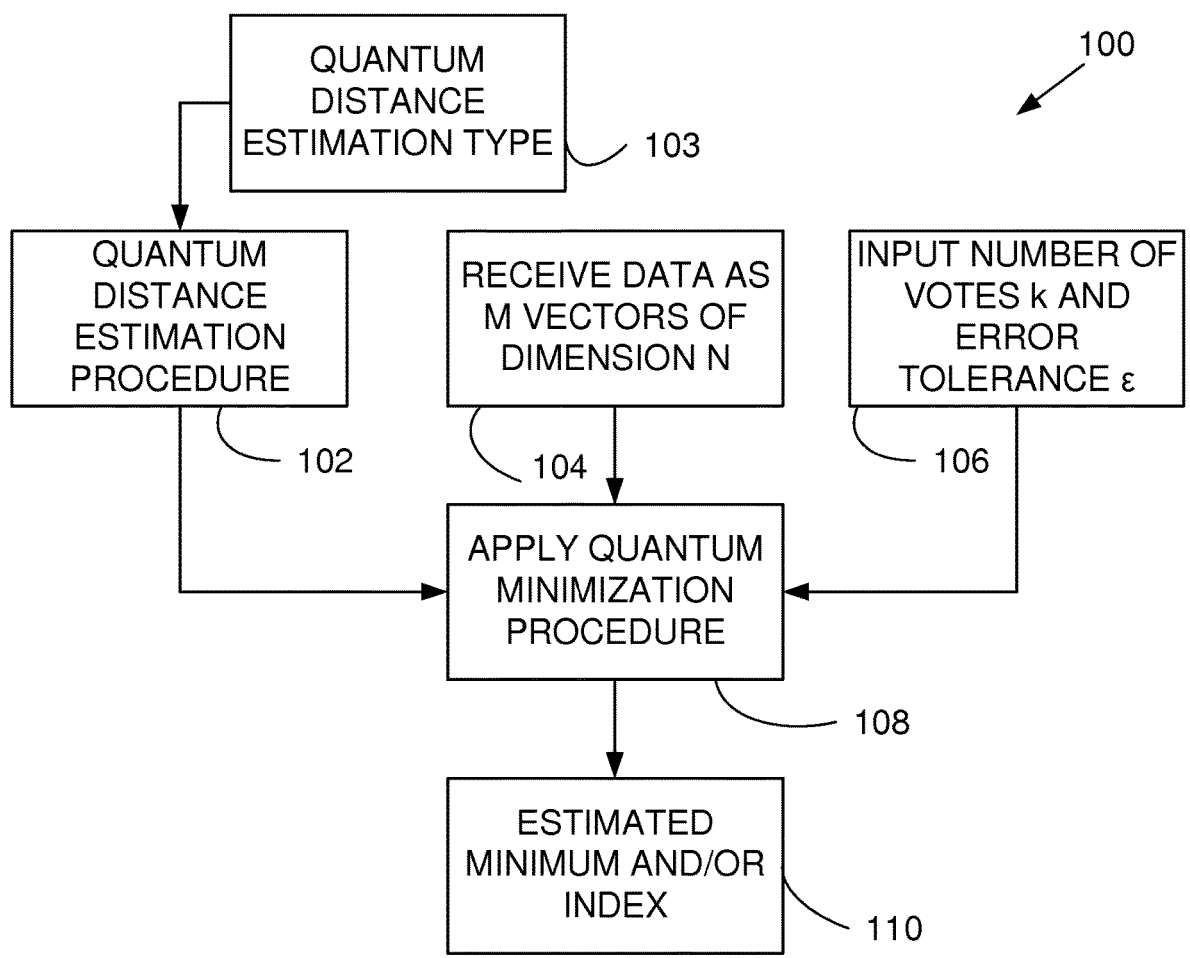
FIG. 1 is a block diagram illustrating a quantum method for determining a nearest neighbor distance or identifying a nearest neighbor to a target data point.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best," "minimum," or the like. It will be appreciated that such descriptions are intended to indicate that a selection among many used functional alternatives can be made, and such selections need not be better, smaller, or otherwise preferable to other selections.

A variety of practical problems can be addressed with the disclosed methods and apparatus. In addition to processing hand written characters, nearest neighbor classification can be used to identify chemical compounds that are similar to a target compound, recognize patterns in videos, still images, audio, or other types of data. Defective items can be identified in a manufacturing process or other types of product selection can be performed. In some cases, a particular data point or data vector is assigned to a data set based on estimation of a closeness of the data point or vector to the elements of the set. For example, a handwritten character can be associated with a set of even numbers or a set of odd numbers based on the distance between the test character and the estimate of the closest odd or even character.

In the disclosed examples, quantum methods permit determination of nearest neighbors. For such determinations, suitable quantum functions are used to obtain distance estimates for inner products or Euclidean distances. Other quantum procedures can be used as well, and a minimum value of any suitably defined quantum function that can be applied to elements of a data set can be used. Particular examples pertaining to quantum determination of inner products, Euclidean distances, data centroids, and mean square distances from a data centroid are described, but these functions are not to be taken as limiting the applicability of the disclosed methods and apparatus. Any distance metric that can be expressed as a quantum function can be used.

In still other examples, distances are obtained by processing input data with, for example, a quantum computer to establish chemical or other properties of compositions. Data can also be represented as classical bit strings, and arbitrary metric functions can be defined to serve as distances functions for nearest neighbor based classification. In general, the disclosed methods are applicable to machine learning in which one or more training data sets are available and each training data point consists of a vector of feature values and an associated label, and a target data set or target data point consists of a vector of feature values and the machine learning task is to assign a label is to the target data points.

In some disclosed examples, minimum distances are used to identify a particular closest data vector and associate a data vector with one or more data sets. In other examples, maximum distances are determined, and data vectors are assigned and identified based on maximum distances. In still other examples, intermediate distances or statistical distances are used.

For convenience, collections of data are referred to as data sets, and elements of data sets are referred to as data points or data vectors. No particular arrangement of data values is required, and data vectors are typically arranged as one-dimensional arrays, but other arrangements can be used. In some applications, determining a distance of a particular data point (sometimes referred to herein as a "target data point" or "target vector") from a data point or set of data points is used to assign a target data point to a particular data set. Such a data set can be referred to as a training set. In some examples, multiple data sets are evaluated, or a single data set is divided into two or more data clusters. Distances from such clusters can be found and assignment of a target data point to one or more such data clusters can be made as described below. In distance estimations, particularly those based on inner products, data vectors are generally normalized to have unit lengths. A data set can be divided into clusters and distances normalized based on a variance of distances within clusters. A target vector can then be assigned to a data set based on distances associated with clusters. This can lead to superior label assignment for a target vector under certain circumstances. In some examples, distances are used to identify a nearest neighbor or assign a target data vector to a set, but distances are not reported. For example, a data vector can be specified by an index that identifies the data vector.

Nearest Neighbor Quantum Searching

In many applications, a nearest neighbor to a particular target data point or data vector is obtained based on distances from the target to other data points or vectors, or sets of data points or vectors. Nearest neighbor classification typically assigns a data point u to a closest data set of two or more data sets based on a selected distance specification. For example, a data point u is assigned to a data set {A} and not to a data set {B} if min|u−a|≤min|u−b| for all a ∈ {A}, b ∈ {B}, wherein |x−a| is defined as a distance between x and a. Distances |x−a| can be determined in a variety of ways. In some disclosed examples, distances between N-dimensional data points x and a are determined based on a Euclidian distance defined as $|x-a|=\sqrt{\Sigma(x_i-a_i)^2}$, wherein $x=(x_1, x_2, \ldots, x_N)$ and $a=(a_1, a_2, \ldots, a_N)$. Distances |x−a| can also be estimated based on a scalar or inner product so that the distance |x−a|=1−x·a. Distances based on inner products are typically applied to normalized data vectors, and in some cases, data normalization is performed prior to distance determination. Finding a nearest neighbor involves finding one or more values or sets of values of a such that the distance |x−a| is minimized. For evaluations based on the inner product, minimization of the distance 1−x·a is equivalent to maximizing the scalar product x·a.

While the examples are generally described with reference to distance minimization, any processing of data values to determine a maximum can generally be transformed into an equivalent minimization procedure. Thus, while the examples are described with reference to minimization, the same procedures can be used in maximization by transformation of a distance or other function appropriately.

A quantum computational method 100 of determining a nearest neighbor is illustrated in FIG. 1. At 102, a particular quantum distance procedure is selected, based in part on a selection of a distance type at 103. Distance determinations generally employ a quantum algorithm P: $|j\rangle |0\rangle \rightarrow |j\rangle |v_j\rangle$ for initial state preparation, for any j>0. A distance $|||v_0\rangle - |v_j\rangle||$ between data vectors represented as quantum states $|v_0\rangle, |v_j\rangle$, respectively, can be obtained based on application of a quantum distance algorithm A to the output of quantum algorithm P, wherein the notation $|j\rangle |v_j\rangle$ represents a combined quantum state. In some examples, selection of a distance type at 103 can also be used to specify a suitable quantum circuit for distance calculations. At 104, data for use in nearest neighbor determinations is received, typically as a set of M vectors of dimension N, wherein M, N are positive integers. This data can be provided directly, or through a quantum subroutine that provides components of the vectors. At 106, a number of votes k, wherein k is a positive integer, and an error tolerance ε are received. The use of the number of votes k and the error tolerance ε are discussed in more detail below. Distance and minimization computations are performed at 108, and one or more of an estimated minimum or an index identifying a data value or vector associated with the minimum is provided at 110. The estimate of $\min \||v_0\rangle - |v_j\rangle\|$ is determined based on the distance algorithm A so as to be accurate within the error tolerance ε.

Figure 2:
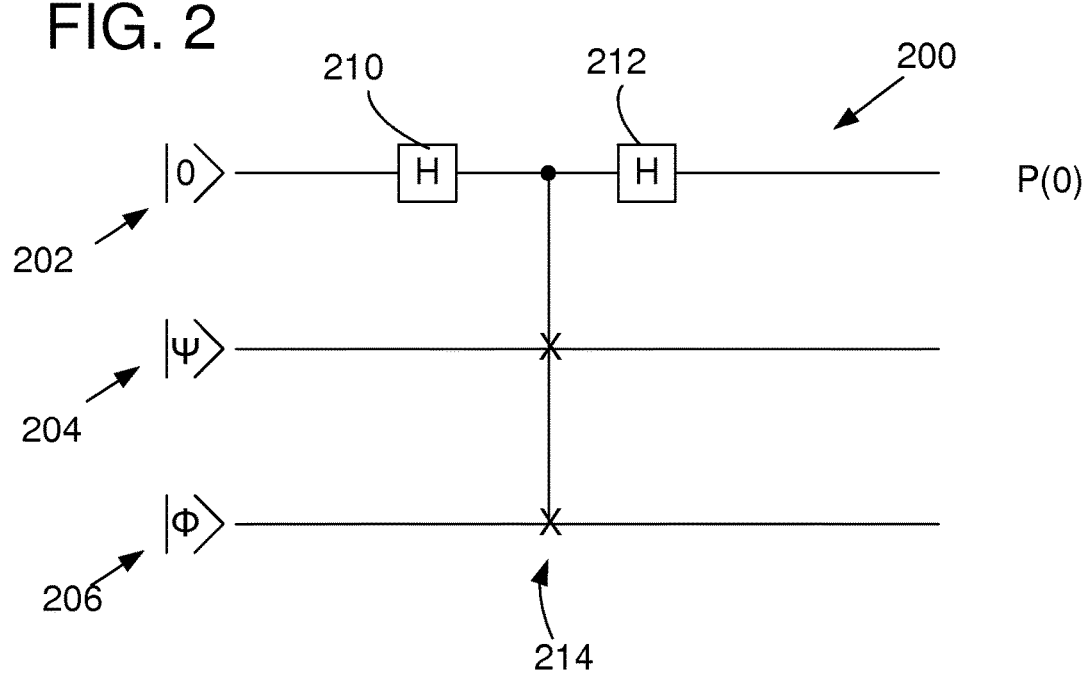
FIG. 2 illustrates a quantum circuit that can be used to obtain an inner product.

In some examples, distances are determined based on an inner product. FIG. 2 illustrates a representative quantum circuit 200 that can be used to determine an inner product of amplitudes associated with quantum states 204, 206. A qubit 202 in a zero state is coupled to a Hadamard gate 210 whose output is coupled as a control input to a controlled swap gate 214. A second Hadamard gate 212 is coupled to the qubit 202 and the resultant state from the quantum circuit 200 can be written as:

$$\tfrac{1}{2}|0\rangle\,(|\varphi\rangle\,|\psi\rangle + |\psi\rangle\,|\varphi\rangle) + \tfrac{1}{2}|1\rangle\,(|\varphi\rangle\,|\psi\rangle - |\psi\rangle\,|\varphi\rangle).$$

Measurement of the first qubit of this output state permits determination of a probability of the $|0\rangle$ state $P(0)$, wherein $$P(0) = \frac{1}{2} + \frac{1}{2}\left|\sum_i \psi_i \varphi_i\right|^2.$$

Determination of $P(0)$ thus permits determination of the absolute value of the inner product $$\langle \psi | \varphi \rangle = \sum_i \varphi_i \psi_i.$$

The inner product can also be found directly by using the following substitution in the above method, for states $|\phi\rangle$ and $|\psi\rangle$:

$$|\phi\rangle \rightarrow \frac{(|0\rangle|0\rangle + |1\rangle|\phi\rangle)}{\sqrt{2}}$$

$$|\psi\rangle \rightarrow \frac{(|0\rangle|0\rangle + |1\rangle|\psi\rangle)}{\sqrt{2}}.$$

Figure 3B:
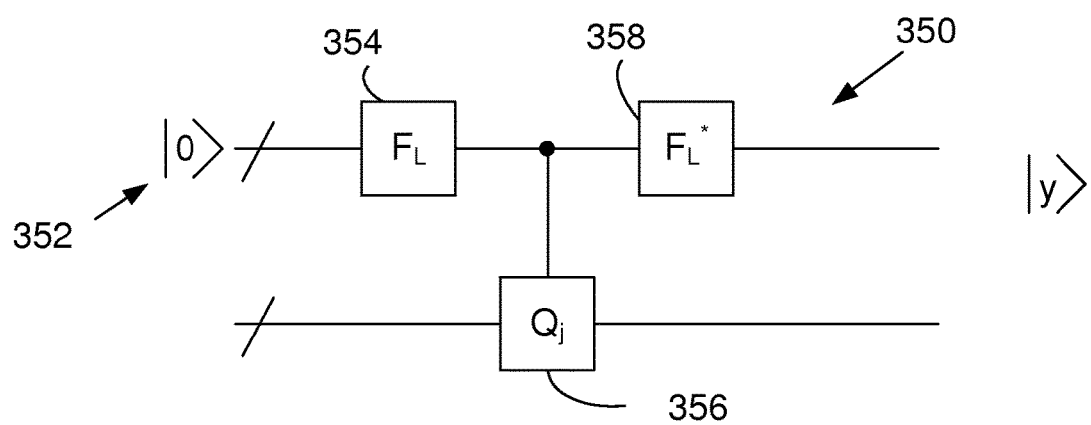
FIG. 3B illustrates a representative quantum circuit for amplitude estimation.
Figure 3A:
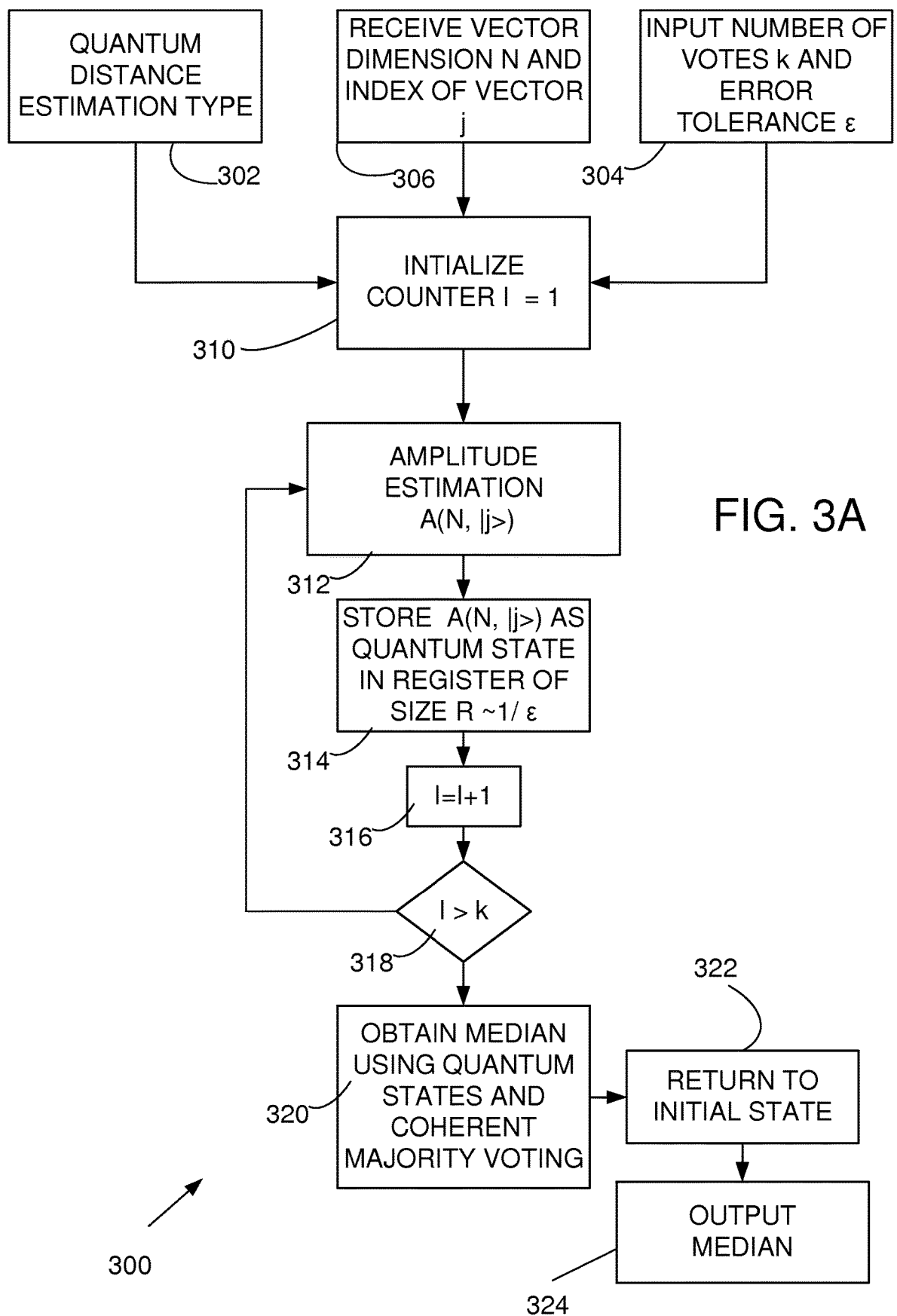
FIG. 3A illustrates a method of estimating a nearest neighbor distance using amplitude estimation and coherent majority voting.

Referring to FIG. 3A, a method 300 of obtaining a distance estimate includes receiving a distance estimate procedure at 302, a set of M N-dimensional vectors provided by a function that accesses components of the vectors at 304 along with an index of a target vector, and a number of votes k and an error tolerance ε at 306. Typically, an index of a vector to be compared with a target vector $|v_0\rangle$ is input as a quantum state $|j\rangle$. At 310 a value of a counter i is initialized, and at 312, amplitude estimation is applied to a vector $A(N, |j\rangle)$ using a quantum register of size $$R \sim \frac{1}{\varepsilon}.$$

In amplitude estimation without measurement, a result is not measured and a projection operator is not used so that the quantum state is preserved. A result is stored as $$|\psi_i\rangle = a\,|y_i\rangle + \sqrt{1 - |a|^2}\,\left|y_i^\perp\right\rangle,$$

wherein each $y_i$ stores a distance $\||v_0\rangle - |v_j\rangle\|$, wherein $|y_i\rangle$ corresponds to a correct answer and $|y_i^\perp\rangle$ corresponds to a quantum superposition of incorrect answers returned by amplitude estimation without measurement. Typically, $a^2 \sim 0.81$, indicating amplitude estimation has reasonable probability of failure. At 316, the index i is incremented, and additional $|\psi_i\rangle$ are determined in the same manner. This continues until the index i=k so that k states $|\psi_i\rangle$ are available.

As noted above, amplitude estimation stores $|a|^2$ with an 81% probability of providing a correct result. To obtain an improved probability of success, coherent majority voting is used in a median operation at 320. For example, with the k values of $|\psi_i\rangle$, $$|\text{median}(\psi_1, \ldots, \psi_k)\rangle \leftarrow \text{Median}(|\psi_1\rangle, \ldots, |\psi_k\rangle)$$

is returned at 320. Even if a single value has only a probability of 81% of being correct, a median value of a set of results will produce a substantially improved likelihood of success. At 324, a distance estimate is returned.

FIG. 3B illustrates a representative circuit 350 for amplitude estimation. A register 352 is initialized to correspond to a $|0\rangle$ state and is coupled to an L-dimensional quantum Fourier transform operator $F_L$ 354. A controlled $Q_j$ operator applies j Grover iterations to a target state if the register 352 has value j. An inverse Fourier transform operator $F_L^*$ is then applied to produce output $|y\rangle$. (The notation * is used to denote the conjugate transpose of the operator $F_L$).

Figure 4:
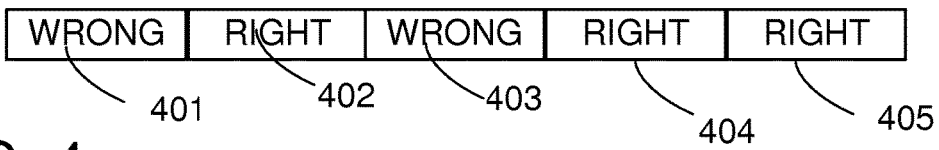
FIG. 4 illustrates a representative example in which five median value estimates include three correct values and two incorrect values.

The benefits of coherent majority voting are illustrated in FIG. 4. Five results 401-405 are obtained, with only three results being the correct value. Nevertheless, a median value of these three correct and two incorrect values is the correct distance value as the correct value is the majority value. Thus, even with quantum computational procedures that provide a limited probability of success, but have a greater probability of success than failure, a correct result can be obtained with success probability arbitrarily close to 1.

The method of FIG. 3A is summarized below in Table 1 as a quantum distance procedure QDIST(N, j, k, ε).

TABLE 1

Pseudocode for Quantum Distance Determination

Input: Dimension of vectors N.
Input: Number of votes used in majority voting scheme k.
Input: Error tolerance ε.

TABLE 1-continued

Pseudocode for Quantum Distance Determination

Input: Index of vector to be compared with $|v_0\rangle$ input as quantum state $|j\rangle$.
Input: Quantum algority, $\mathcal{F}$ : $|j\rangle$ $|0\rangle \mapsto |j\rangle |v_j\rangle$ for any j, quantum algorithm $\mathcal{A}$ such that for any j > 0 $\| |v_0\rangle - |v_j\rangle \|$ can be inferred by sampling from the output of $\mathcal{A}$ (j).
Output: Quantum state that contains an ε-close approximation to $\| |v_0\rangle - |v_j\rangle \|$, where $\| \cdot \|$ is the distance measure computed by $\mathcal{A}$.

function QDIST(N, j, k, ε)
     for i ∈ 1 → k do
       Apply amplitude estimation on $\mathcal{A}$ (N, $|j\rangle$) using a register of size R α 1/ε and without measuring the result.

Store result as quantum state $|\psi_k\rangle = a|y_k\rangle + \sqrt{1-|a|^2}|y\tfrac{1}{k}\rangle$.

▷ Each $y_k$ stores $\| |v_0\rangle - |v_j\rangle \|$ with $|a|^2 \approx 81\%$

▷ $|y\tfrac{1}{k}\rangle$ refers to an incorrect answer that is yielded by the amplitude estimation algorithm end for
     $|\text{median}(\psi_1, \ldots, \psi_k)\rangle \leftarrow \text{Median}(|\psi_1\rangle, \ldots, |\psi_k\rangle)$.
     Undo all steps previous to the median calculation step above.
     return $|\text{median}(\psi_1, \ldots, \psi_k)\rangle$.
   end function As shown in Table 1, distance determination is not limited to any particular definition of distance but is based on application of a suitable quantum distance operation (shown as A in Table 1). After the coherent majority voting at 320, steps associated with amplitude estimation are undone at 322. Because operations associated with amplitude estimation without measurement are unitary, the operations can be reversed to arrive at the initial distribution of states.

Figure 5:
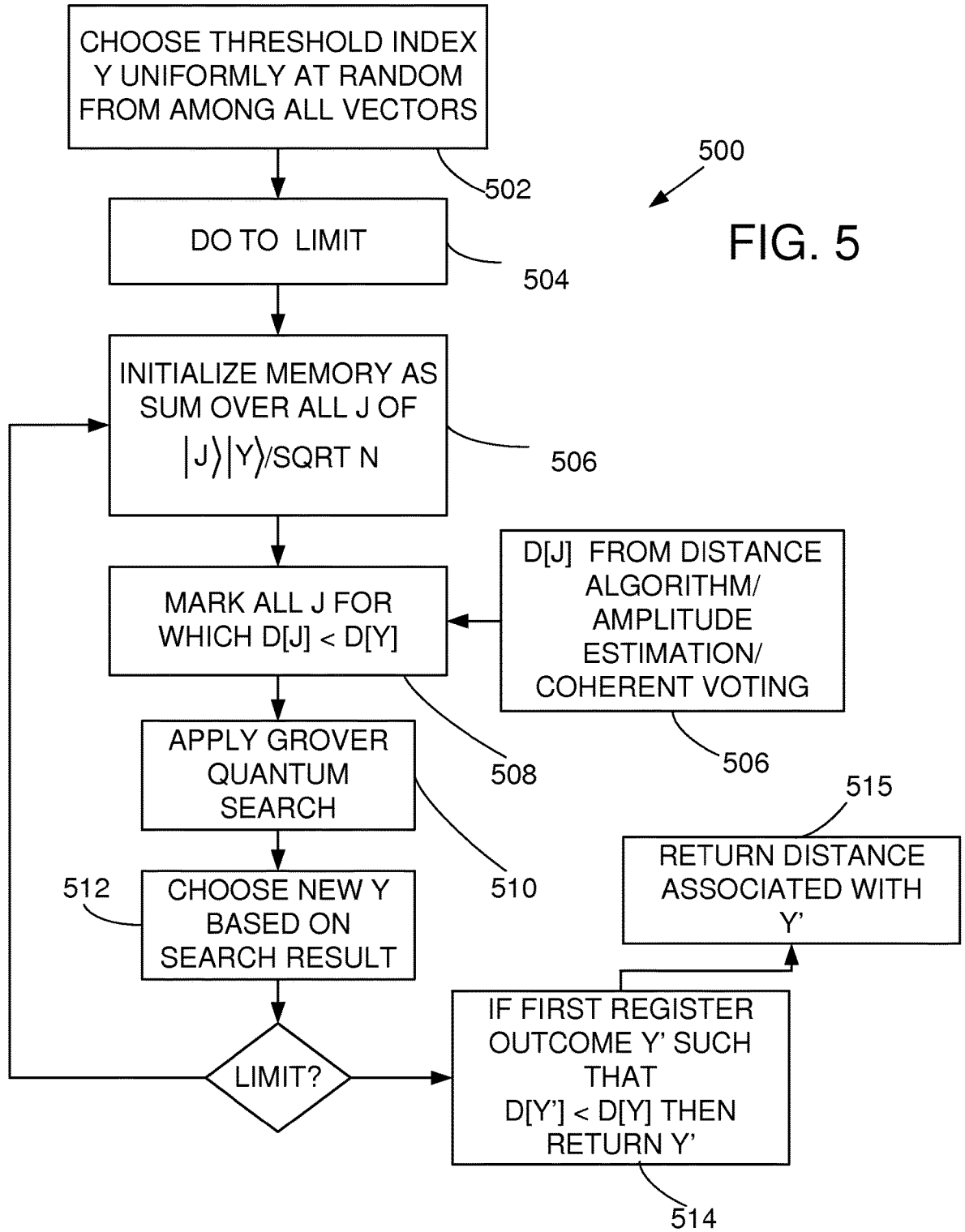
FIG. 5 illustrates a quantum method of determining a nearest neighbor estimate using a Dürr-Høyer minimization, amplitude estimation without measurement, and coherent majority voting.

A minimum distance value or an index associated with a minimum distance can be obtained using a Dürr-Høyer minimization procedure illustrated in FIG. 5. At 502, a threshold index y is chosen uniformly at random from among all the vectors of a data set. At 504, an iterative procedure is initiated. At 506, a quantum memory is initialized as a sum over all states for the selected y with a uniform weighting. At 508, all states for which D[j] is less than D[y] are marked, wherein D is a suitable distance function such as QDIST as discussed above. A quantum search method such as a Grover search is applied at 510. At 512, the threshold index y is assigned a revised value based on the result of the search at 510. In some cases, a limited number of additional searches at 510 is needed. Typically, about 22.5 $\sqrt{M}+1.4(\log_2 N)^2$ searches are sufficient, and additional searching may be counterproductive. At 514, an outcome y' is associated with an observation of a first register, and if the distance associated with y' is less than that associated with y, the index value y' is provided as an output, designating the y'th vector of the data set. At 515, a distance associated with the index can be output, instead of or in addition to the index value y'. The Dürr-Høyer method is described in further detail in Dürr and Høyer, "A quantum algorithm for finding the minimum," arXiv:quant-ph/90607014v2 (Jan. 7, 1999), which is incorporated herein by reference.

The method of FIG. 5 is summarized in Table 2 below.

TABLE 2

Pseudocode for a Quantum Distance Minimization Method

Input: Number of vectors M.
Input: Dimension of vectors N.
Input: Number of votes used in majority voting scheme k.

TABLE 2-continued

Pseudocode for a Quantum Distance Minimization Method

Input: Error tolerance ε.
Input: Quantum algorithm, $\mathcal{F}$ : $|j\rangle$ $|0\rangle \mapsto |j\rangle |v_j\rangle$ for any j, quantum algorithm $\mathcal{A}$ such that for any j > 0 $\| |v_0\rangle - |v_j\rangle \|$ can be inferred by sampling from the output of $\mathcal{A}$.
Output: Estimate of $\min_j \| |v_0\rangle - |v_j\rangle \|$ that is accurate within error ε, where $\| \cdot \|$ is the distance measure computed by $\mathcal{A}$.
   function QMINDIST(N, M, k, ε)
     Apply the Dürr, Høyer minimization algorithm to find the minimum value of median($\psi_1, \ldots, \psi_k$) output by QDist(N, ·, k, ε).
     return Estimate of $\min_j \| |v_0\rangle - |v_j\rangle \|$ yielded by minimization algorithm.
   end function The method of FIG. 5 can be used with various quantum distance algorithms. As discussed above, the function QDIST receives a distance definition as an input. Typical distances used in QDIST are based on inner products or Euclidean distances.

Figure 6:
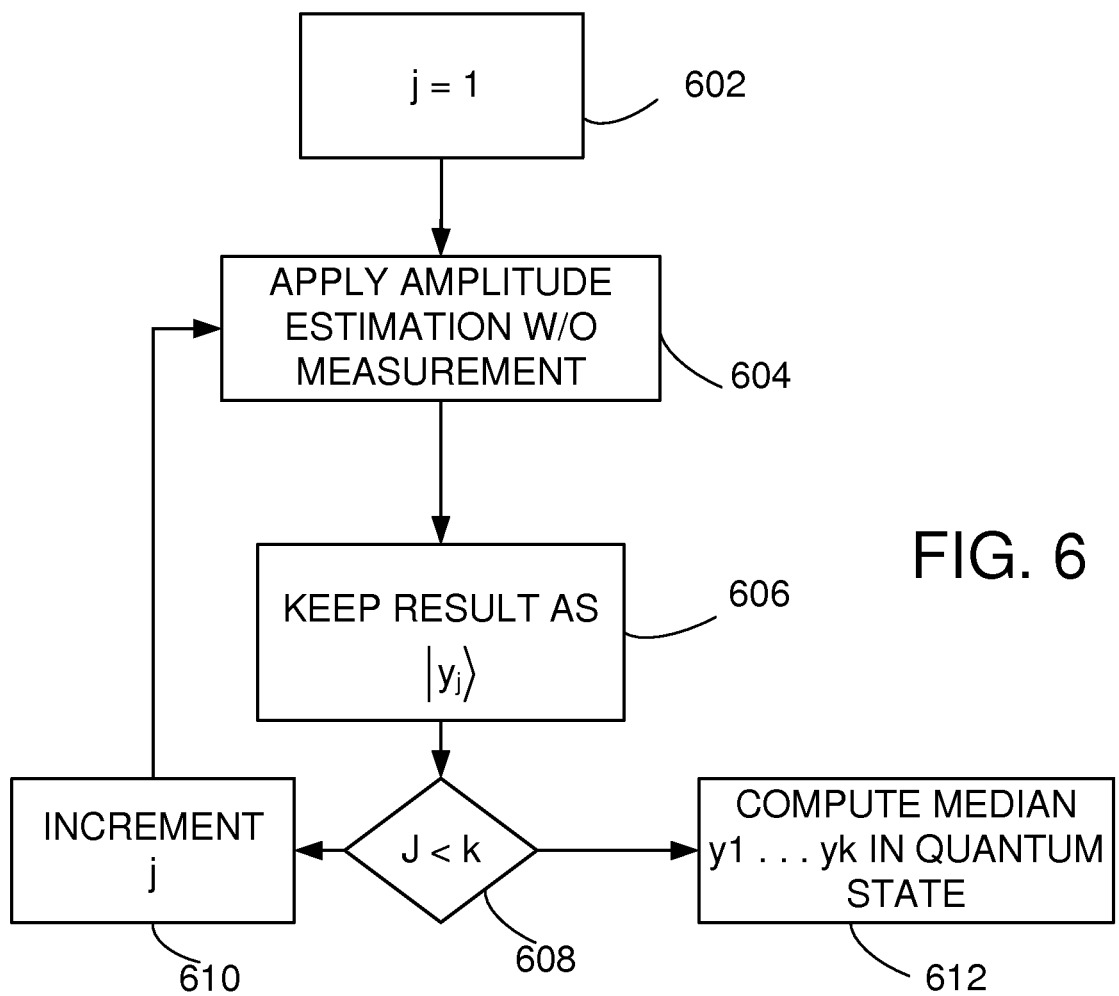
FIG. 6 further illustrates coherent majority voting and amplitude estimation without measurement.

Amplitude estimation is further illustrated in FIG. 6. At 602, an initial counter j is initialized, and at 604, amplitude estimation without measurement is applied. A result is retained as $|y_j\rangle$. Additional values are obtained if j<k as determined at 608. The counter j is incremented at 610 and additional $|y_j\rangle$ results are obtained. Once k values of $|y\rangle$ are found, a median is computed at 612 based on all of the $|y\rangle$ results.

Quantum Methods of Determining Medians and $m^{th}$ Smallest Elements

Figure 7:
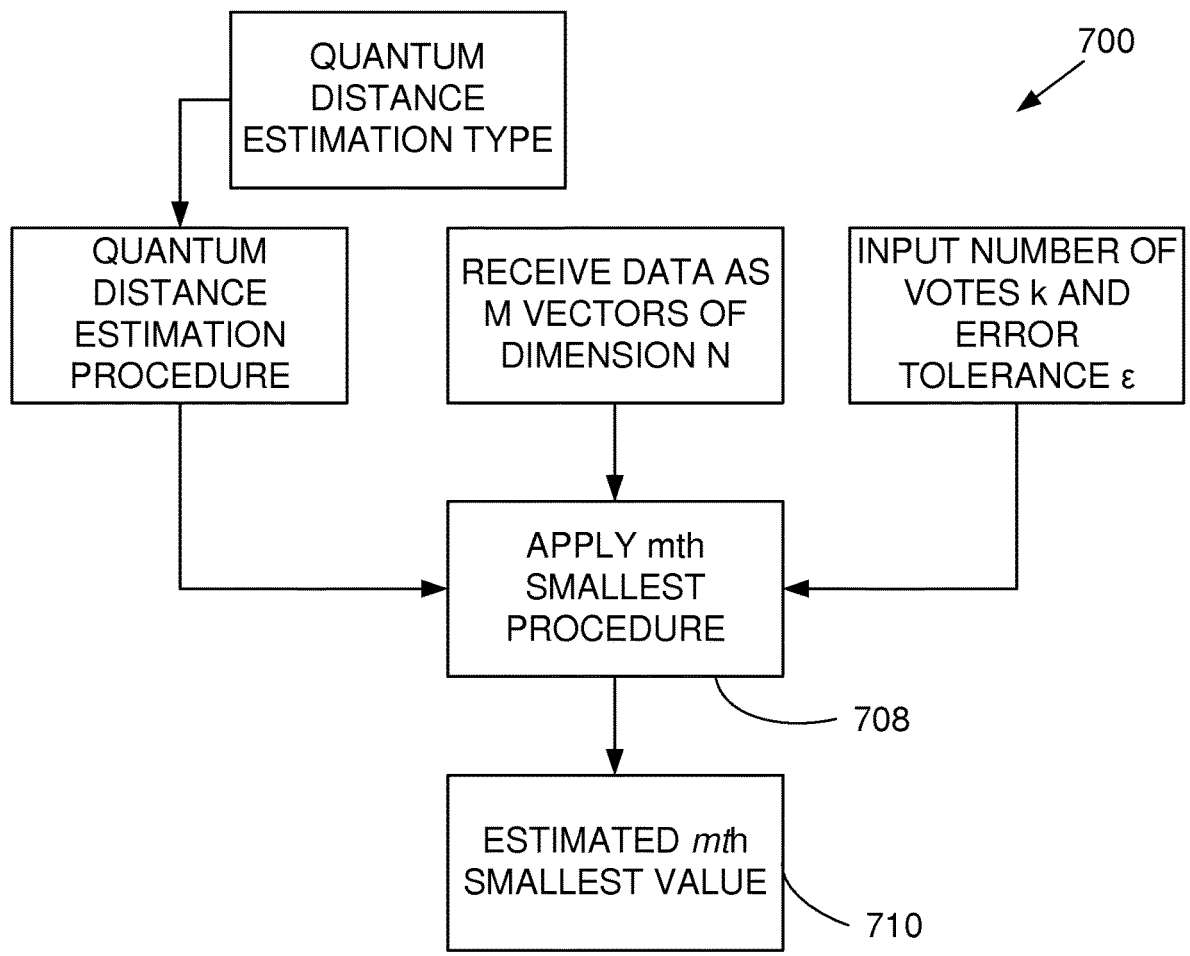
FIG. 7 illustrates a method of determining an mth smallest value using amplitude estimation without measurement, and coherent majority voting.

The nearest neighbor determinations discussed above are associated with minimizing distances between data vectors. In other examples, medians or other values can be determined. An ε-approximate median of a sequence X of n numbers is a number $x_i$ such that the number of $x_j$ greater than $x_i$ and less than $x_i$ are less than $(1+\varepsilon)n/2$. A Δ-approximate $k^{th}$ smallest element is a number $x_i$ that is the $k^{th}$ smallest element of X between k–Δ and k+Δ. Data points associated with, for example, $m^{th}$ smallest distances can be found as shown in FIG. 7. Processing is similar to that of FIG. 5 above, but at 708 an $m^{th}$ smallest procedure is executed, and a resulting estimate is provided as an output at 710. A suitable $m^{th}$ smallest procedure is described in Nayak and Wu, "The quantum query complexity of approximating the median and related statistics," available at arXiv: quant-ph/9804066v2 (Nov. 15, 1998), which is incorporated herein by reference.

Distances to Cluster Centroids

Figures 8, 9:
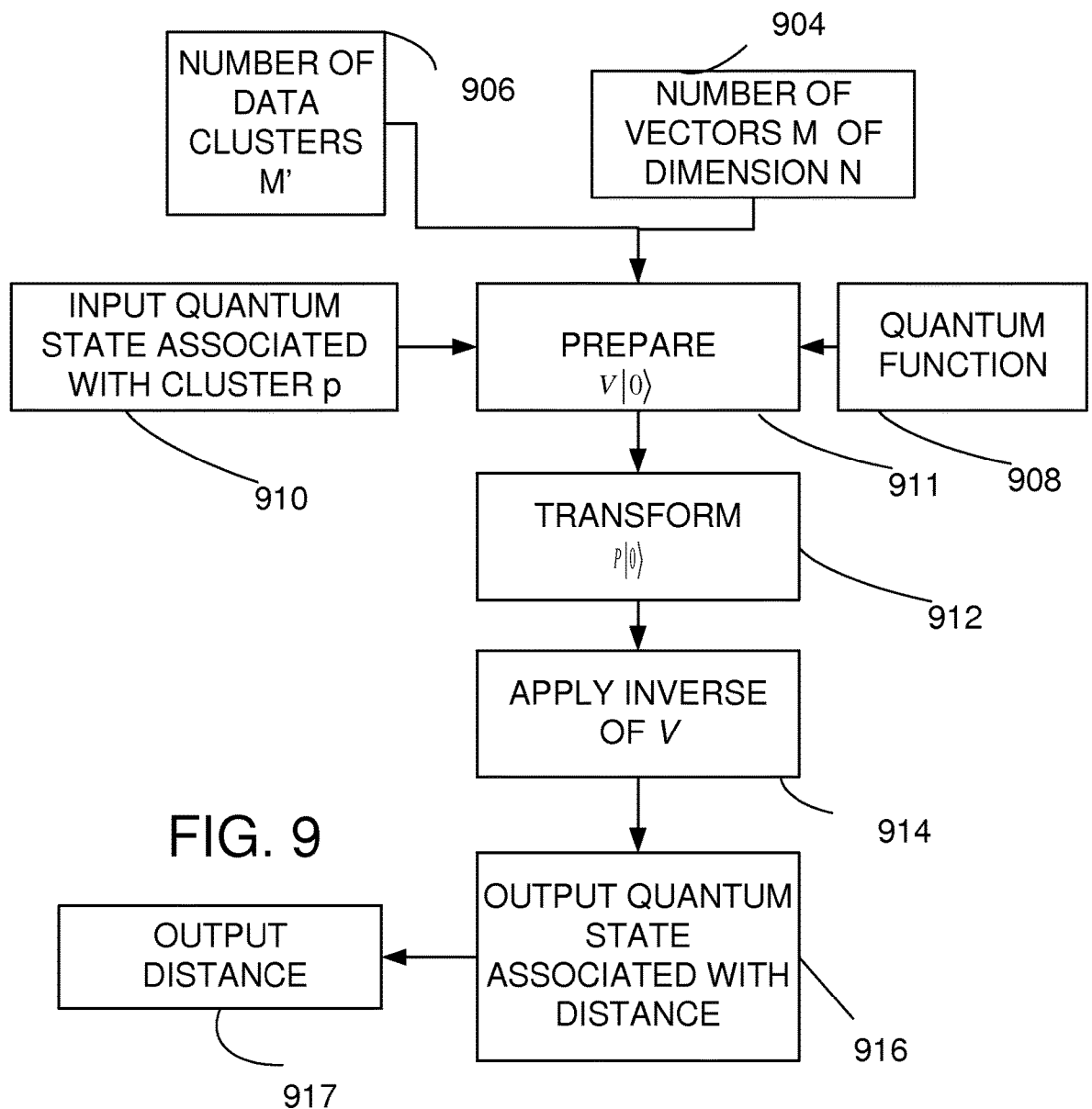
FIG. 8 illustrates a target data point situated among two data clusters.
FIG. 9 illustrates a method of assigning a target data point to a data cluster.

As shown above, quantum computers and circuits can be arranged to determine a nearest neighbor or an $m^{th}$ closest neighbor to a target vector. In some applications, a target vector is evaluated to determine if it should be associated with a particular data cluster. For example, as shown in FIG. 8, a target data point 802 has values such that the target data point 802 is situated among data clusters 804, 806. Assignment or association of the target data 802 point to a particular data cluster can be complicated due to the complex arrangements of the data clusters 804, 806 or the location of the data point 802.

A quantum computing method of assigned in data point to a particular data set or data cluster from among a plurality data sets or data clusters is illustrated in FIG. 9. At 904, a number of vectors M and a dimension N of the vectors is received. A number of data clusters M' is received at 906, and at 910, a particular cluster number p is input as a quantum state $|p\rangle$. A quantum function is provided at 908 such that $|p\rangle |j\rangle |0\rangle \rightarrow |p\rangle |j\rangle |v_j^p\rangle$, wherein $|v_j^p\rangle$ is vector in the cluster p and $|v_j^p\rangle = |v_0\rangle$ for all p. At 911, an operator V is applied so that:

$$|\psi\rangle \leftarrow V|0\rangle = \frac{1}{\sqrt{2}}|p\rangle|0\rangle|0\rangle + \sqrt{\frac{M'}{2M}}\sum_{j=1}^{\frac{M}{M'}}|p\rangle|j\rangle|0\rangle.$$

At 912, a state preparation procedure is executed so that $$|\psi\rangle \leftarrow P|\psi\rangle = \frac{-1}{\sqrt{2}}|p\rangle|0\rangle|v_0\rangle + \sqrt{\frac{M'}{2M}}\sum_{j=1}^{\frac{M}{M'}}|p\rangle|j\rangle|v_j\rangle.$$

At 914, the inverse of the operator V is applied, and at 916, and an output state is provided such that the probability of measuring a first register to be zero is proportional to a square of the Euclidean distance:

$$P(0) \propto \left| v_0 \rangle - \frac{M'}{M}\sum_{j=1}^{\frac{M}{M'}}|v_j^p\rangle \right|^2.$$

At 917, a distance can be output based on the output quantum state.

The method of FIG. 9 is summarized in Table 3 below.

TABLE 3

Pseudocode for a Quantum Distance to Cluster Centroid Method

Input: Dimension of vectors N.
Input: Number of vectors M.
Input: Number of clusters M'.
Input: Cluster number p input as quantum state $|p\rangle$.
Input: Quantum algorithm: $|p\rangle |j\rangle |0\rangle \mapsto |p\rangle |j\rangle |v_j^{(p)}\rangle$, where each $|v_j^{(p)}\rangle$ is one of the vectors in cluster p and $|v_0^{(p)}\rangle = |v_0\rangle$ for all p.
Output: Quantum state in $\mathbb{C}^{M \cdot N}$ such that the probability of measuring the first register (the one of dimension M) to be 0 is proportional to the square of the Euclidean distance: $\left| |v_0\rangle - \frac{M'}{M} \sum_{j=1}^{M/M'} |v_j^{(p)}\rangle \right|$.

function QCENTDIST(N, $|p\rangle$, M, M')

$$|\psi\rangle \leftarrow V|0\rangle := \frac{1}{\sqrt{2}}|p\rangle|0\rangle|0\rangle + \sqrt{\frac{M'}{2M}}\sum_{j=1}^{M}|p\rangle|j\rangle|0\rangle.$$

Use state preparation procedure, $\mathcal{P}$ to transform state as $|\psi\rangle \leftarrow \mathcal{P}|\psi\rangle =$ $$\frac{-1}{\sqrt{2}}|p\rangle|0\rangle|v_0\rangle + \sqrt{\frac{M'}{2M}}\sum_{j=1}^{M}|p\rangle|j\rangle|v_j\rangle.$$

▷ This creates the right superposition of states to give the average of the vectors and subtract off the vector $|v_0\rangle$
▷ Multiplying any of the terms above by −1 (or more generally a complex phase does not change the algorithm's function
   $|\psi\rangle \leftarrow V^\dagger |\psi\rangle$. ▷ $V^\dagger$ is the inverse of V operation
   return $|\psi\rangle$
end function A method similar to that of FIG. 9 permits determination of a mean square of distances between points within a cluster and a cluster centroid. In this method, a quantum function is used such that $|q\rangle |p\rangle |j\rangle |0\rangle \rightarrow |q\rangle |p\rangle |j\rangle |v_j^p\rangle$, for $j>0$, wherein $|v_j^p\rangle$ is a vector in the cluster p and $|v_j^p\rangle = |v_0\rangle$ for all p, and $|q\rangle |p\rangle |j\rangle |0\rangle \rightarrow |q\rangle |p\rangle |j\rangle |v_q^p\rangle$ and for j=0.

An operator V is applied so that:

$$|\psi\rangle \leftarrow V|0\rangle = \frac{1}{\sqrt{2}} \sum_{q=1}^{M/M'} (|q\rangle |p\rangle |0\rangle |0\rangle) + \frac{1}{\sqrt{2M/M'}} \sum_{j=1}^{M/M'} |q\rangle |p\rangle |j\rangle |0\rangle)$$

A state preparation procedure is executed so that $|\psi\rangle \leftarrow P|\psi\rangle$ and an inverse of V is applied, $|\psi\rangle \leftarrow V^\dagger |\psi\rangle$, so that an output is provided having a probability P(0) of the measuring a first register to be zero is proportional to:

$$P(0) \propto \sum_{q=1}^{M/M'} \| v_q^p \rangle - \frac{M'}{M} \sum_{j=1}^{M/M'} |v_j^p\rangle |^2.$$

This method is summarized in Table 4 below.

mization circuit 1004 is coupled to the quantum distance circuit 1002 and one or more quantum registers 1010. Typically, the circuit 1004 is configured to implement the Dürr-Høyer method. A quantum amplitude estimation circuit 1006 and a quantum coherent voting circuit 1008 are also coupled so as to communicate with the quantum minimization circuit 1004. Circuits can be defined with any available qubits as is convenient. In other examples, a quantum $m^{th}$ nearest neighbor circuit is included in addition to or instead of the quantum minimization circuit 1004.

Representative Computing Environments

Figure 11:
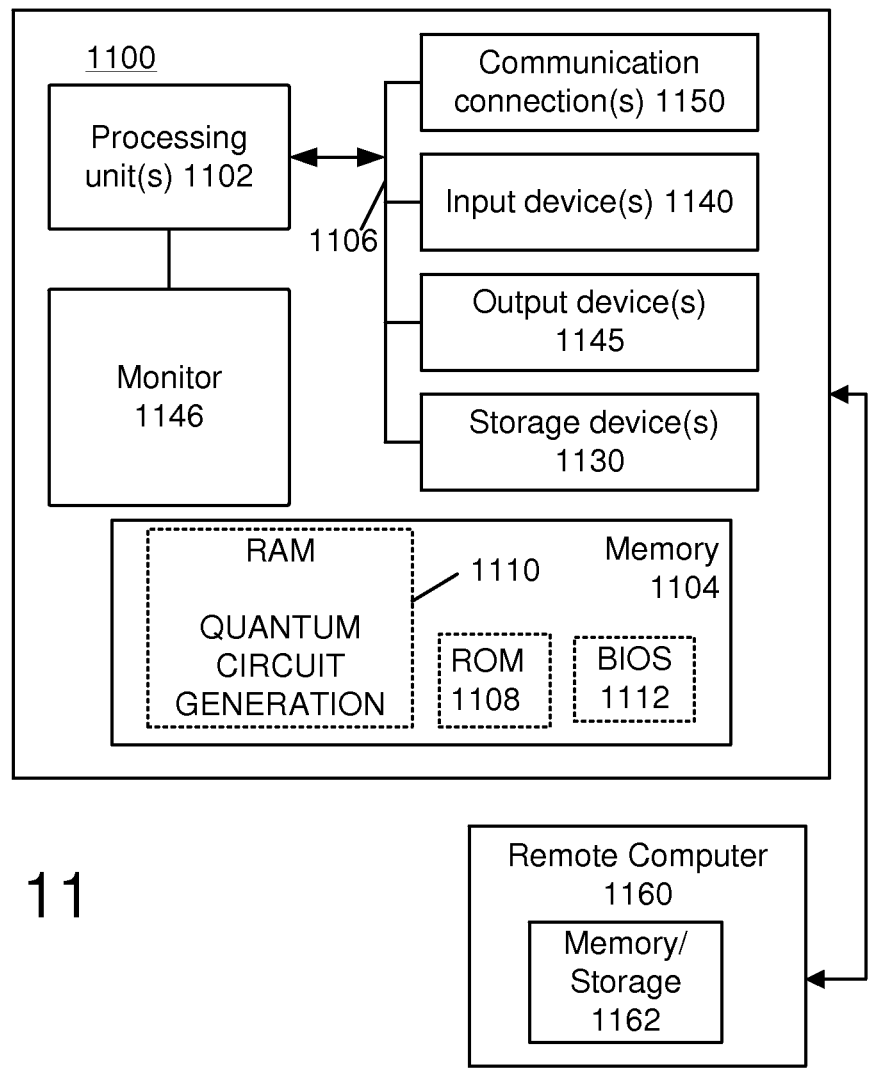
FIG. 11 is a block diagram of a representative computing environment in which the disclosed methods can be implemented.

FIG. 11 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable

TABLE 4

Pseudocode for a Quantum Mean Square Distances in Cluster

Input: Dimension of vectors N.
Input: Number of vectors M.
Input: Number of clusters M'.
Input: Cluster number p input as quantum state $|p\rangle$.
Input: Quantum algorithm $\mathcal{P}: |q\rangle |p\rangle |j\rangle |0\rangle \mapsto |q\rangle |p\rangle |j\rangle |v_j^{(p)}\rangle$ for j > 0, where each $|v_j^{(p)}\rangle$ is one of the vectors in cluster p and $|v_0^{(p)}\rangle = |v_0\rangle$ for all p and $\mathcal{P}: |q\rangle |p\rangle |j\rangle |0\rangle \mapsto |q\rangle |p\rangle |j\rangle |v_q^{(p)}\rangle$ for j = 0.
Output: Quantum state in $\mathbb{C}^{M \cdot N}$ such that the probability of measuring the first register (the one of dimension M) to be 0 is proportional to: $\left| \frac{M'}{M} \sum_{q=1}^{M/M'} |v_q^{(p)}\rangle - \frac{M'}{M} \sum_{j=1}^{M/M'} |v_j^{(p)}\rangle \right|^2$.

function QMNSQDIST(N, $|p\rangle$, M, M')

$|\psi\rangle \leftarrow V|0\rangle := \frac{1}{\sqrt{2}}$ $\sum_{q=1}^{M/M'} \left( |q\rangle |p\rangle |0\rangle |0\rangle + \frac{1}{\sqrt{2M/M'}} \sum_{j=1}^{M/M'} |q\rangle |p\rangle |j\rangle |0\rangle \right)$.

Figure 10:
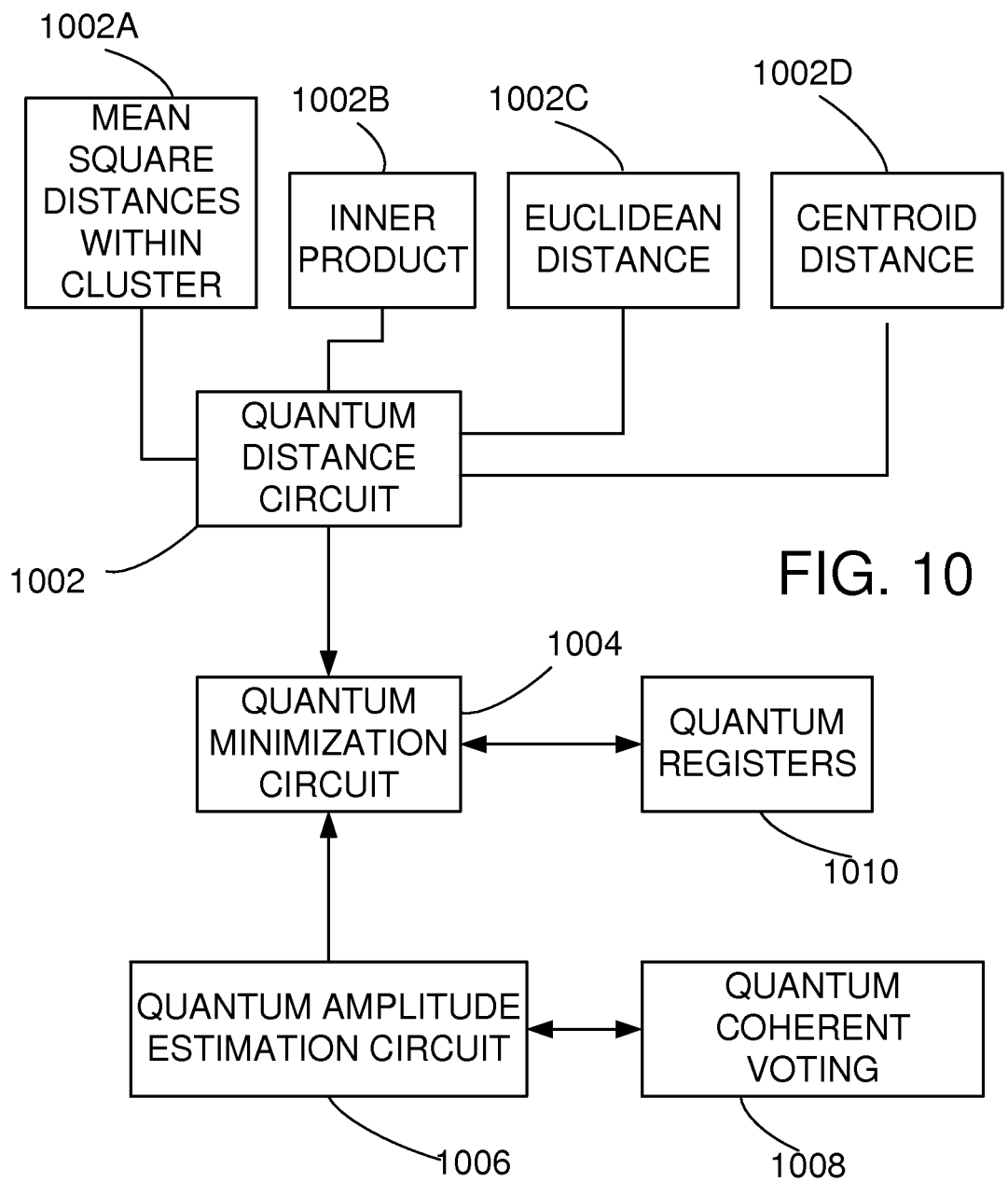
FIG. 10 illustrates a representative quantum minimization circuit.

Use state preparation procedure, $\mathcal{P}$ to transform state as $|\psi\rangle \leftarrow \mathcal{P} |\psi\rangle$.
 ▷ This creates the right superposition of states to give the average of the vectors and subtract off the vector $|v_0\rangle$
$|\psi\rangle \leftarrow V^\dagger |\psi\rangle$.  ▷ $V^\dagger$ is the inverse of V operation
return $|\psi\rangle$
end function Representative Quantum Computing Devices Referring to FIG. 10, a representative quantum computing device adaptable to performing the disclosed methods includes a quantum distance circuit selector 1002 that is configured to select or implement distance circuits 1002A-1002D that can provide distance estimates associated with mean square distance with a cluster of data vectors, an inner produce, a Euclidean distance, or a distance to a cluster centroid, respectively, or other distances. A quantum miniconsumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, an exemplary system for implementing the disclosed technology includes a general purpose computing device in the form of an exemplary conventional PC 1100, including one or more processing units 1102, a system memory 11, and a system bus 506 that couples various system components including the system memory 1104 to the one or more processing units 1102. The system bus 1106 may be any of several types of bus structures including a memory bus or memory controller, a peripheral bus, and a local bus using any of a variety of bus architectures. The exemplary system memory 1104 includes read only memory (ROM) 1108 and random access memory (RAM) 1110. A basic input/output system (BIOS) 1112, containing the basic routines that help with the transfer of information between elements within the PC 1100, is stored in ROM 1108. As shown in FIG. 1, RAM 1110 can store computer-executable instructions for defining and coupling quantum circuits such as quantum circuits implementing distance functions, amplitude estimation without measurement, coherent majority voting or other quantum circuit functions and procedures. In addition, some functions and procedures can be selected for implementation in conventional (non-quantum) computing hardware.

The exemplary PC 1100 further includes one or more storage devices 1130 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1106 by a hard disk drive interface, a magnetic disk drive interface, and an optical drive interface, respectively. The drives and their associated computer readable media provide nonvolatile storage of computer-readable instructions, data structures, program modules, and other data for the PC 1100. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1130 including an operating system, one or more application programs, other program modules, and program data. Storage of quantum syntheses and instructions for obtaining such syntheses can be stored in the storage devices 1130. For example, Grover iteration circuits, Dürr-Høyer method circuits, inner product circuits, and other circuit can be defined by a quantum computer design application and circuit definitions can be stored for use in design. A user may enter commands and information into the PC 1100 through one or more input devices 1140 such as a keyboard and a pointing device such as a mouse. Other input devices may include a digital camera, microphone, joystick, game pad, satellite dish, scanner, or the like. These and other input devices are often connected to the one or more processing units 1102 through a serial port interface that is coupled to the system bus 1106, but may be connected by other interfaces such as a parallel port, game port, or universal serial bus (USB). A monitor 1146 or other type of display device is also connected to the system bus 1106 via an interface, such as a video adapter. Other peripheral output devices, such as speakers and printers (not shown), may be included. In some cases, a user interface is display so that a user can input a circuit for synthesis, and verify successful synthesis.

The PC 1100 may operate in a networked environment using logical connections to one or more remote computers, such as a remote computer 1160. In some examples, one or more network or communication connections 1150 are included. The remote computer 1160 may be another PC, a server, a router, a network PC, or a peer device or other common network node, and typically includes many or all of the elements described above relative to the PC 1100, although only a memory storage device 1162 has been illustrated in FIG. 11. The personal computer 1100 and/or the remote computer 1160 can be connected to a logical a local area network (LAN) and a wide area network (WAN). Such networking environments are commonplace in offices, enterprise wide computer networks, intranets, and the Internet.

When used in a LAN networking environment, the PC 1100 is connected to the LAN through a network interface. When used in a WAN networking environment, the PC 1100 typically includes a modem or other means for establishing communications over the WAN, such as the Internet. In a networked environment, program modules depicted relative to the personal computer 1100, or portions thereof, may be stored in the remote memory storage device or other locations on the LAN or WAN. The network connections shown are exemplary, and other means of establishing a communications link between the computers may be used.

Figure 12:
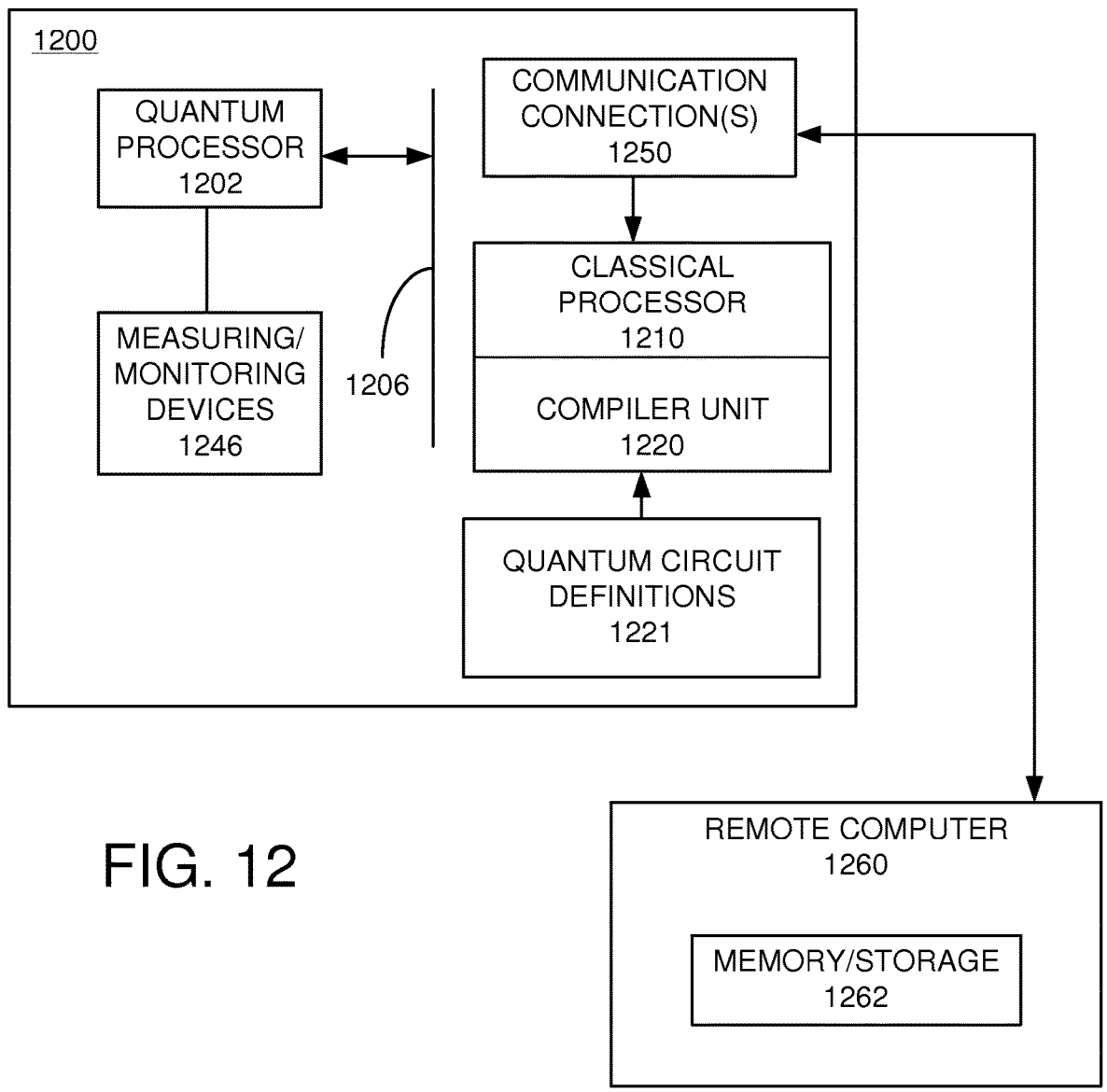
FIG. 12 is a block diagram of a representative computing environment that includes classical and quantum processing.

With reference to FIG. 12, an exemplary system for implementing the disclosed technology includes computing environment 1200, where compilation into quantum circuits is separated from quantum processing that uses the compiled circuits. The environment includes a quantum processing unit 1202 and one or more monitoring/measuring device(s) 1246. The quantum processor executes quantum circuits that are precompiled by classical compiler unit 1220 using one or more classical processor(s) 1210. The precompiled quantum circuits are downloaded into the quantum processing unit via quantum bus 1206. In some cases, quantum circuits or portions thereof are predefined and stored as quantum circuit definitions in a memory 1221. For example, quantum circuits associated with distance determinations, amplitude estimation, minimization, coherent majority voting, mth nearest neighbor determinations, or other functions and procedures or portions thereof can be stored in a library. A classical computer can be arranged to control a quantum computer or one or more quantum circuits thereof. The classical computer can receive the output of a classical or quantum computer. Based on the received output, the classical computer indicates which quantum circuits are to be used in subsequent quantum computations, provides definitions of suitable quantum circuits, or, in some cases, controls additional classical computations.

With reference to FIG. 12, the compilation is the process of translation of a high-level description of a quantum algorithm into a sequence of quantum circuits. Such high-level description may be stored, as the case may be, on one or more external computer(s) 1260 outside the computing environment 1200 utilizing one or more memory and/or storage device(s) 1262, then downloaded as necessary into the computing environment 1200 via one or more communication connection(s) 1250. The high-level description can be stored and interpreted classically, and a classical computer can control the sequence of gates defined in a quantum computer. The high level description also controls application of gates based on initial, intermediate, or final data values.

In view of the many possible embodiments to which the principles of the disclosed technology may be applied, it should be recognized that the illustrated embodiments are only preferred examples and should not be taken as limiting the scope of the disclosure. We therefore claim all that comes within the scope and spirit of the appended claims.

We claim:

1. A method of preparing a quantum computation, comprising:
   with a computer, defining a first quantum circuit that obtains an estimate of a distance between a target vector and a data vector from a set of data vectors;
   with the computer, defining a second quantum circuit so as to produce a plurality of quantum states associated with corresponding distance estimates based on amplitude estimation without measurement and provide a distance estimate based on a plurality of amplitudes associated with quantum distances; and
   configuring a quantum computer based on the definition of the first quantum circuit and the second quantum circuit.

2. The method of claim 1, wherein the second quantum circuit is configured to produce a quantum state corresponding to a median value of the distance estimates.

3. The method of claim 1, wherein the second quantum circuit is configured to produce a median distance based on the quantum state corresponding to the median value of the distance estimates.

4. The method of claim 1, wherein the first quantum circuit determines the estimate of distance based on an inner product of the target vector and the vectors of the set of data vectors.

5. The method of claim 1, wherein the first quantum circuit determines the estimate of distance as a Euclidean distance between the target vector and the vectors of the set of data vectors.

6. The method of claim 1, further comprising defining a third quantum circuit configured to determine a nearest neighbor vector of the set of data vectors associated with a minimum distance between the target vector and the vectors of the set of data vectors.

7. The method of claim 6, wherein the third quantum circuit is configured to determine the nearest neighbor distance based on the Dürr-Høyer algorithm.

8. The method of claim 1, further comprising defining a third quantum circuit configured to determine a nearest neighbor distance corresponding to a minimum distance between the target vector and the vectors of the set of data vectors.

9. The method of claim 1, further comprising defining a third quantum circuit configured to determine an $m^{th}$ smallest distance between the target vector and the vectors of the set of data vectors or an index associated with the vector of the set of data vectors associated with the $m^{th}$ smallest distance.

10. The method of claim 9, wherein the first quantum circuit determines the estimate of distance based on an inner product of the target vector and the vectors of the set of data vectors or as a Euclidean distance between the target vector and the vectors of the set of data vectors.

11. The method of claim 1, further comprising defining a coherent voting quantum circuit that determines a number of votes associated with the plurality of amplitudes so that the distance estimate is based on the number of votes.

12. A non-transitory computer-readable medium comprising computer-executable instructions for a method of specifying circuits for a quantum computer, the method comprising:
   defining a quantum distance circuit configured to implement a quantum distance operator; and
   establishing an amplitude estimation quantum circuit configured to provide a plurality of amplitudes associated with quantum distances based on the quantum distance operator, wherein the amplitudes are estimated without qubit measurement.

13. The computer-readable medium of claim 12, wherein the method further comprises defining a coherent voting quantum circuit that provides a distance estimate based on the plurality of amplitudes associated with quantum distances.

14. The computer readable medium of claim 13, wherein the distance estimate is an estimate of a minimum distance.

15. The computer readable medium of claim 14, wherein the quantum distance circuit is configured to produce distance as a Euclidean distance or an inner product.

16. The computer readable medium of claim 13, wherein the quantum distance circuit produces a distance from a data centroid, or a mean square distance from a data centroid.

17. The computer readable medium of claim 12, wherein distance of the plurality of distances are associated with data vectors in one or more training sets, and the method further comprises defining a circuit that assigns a target data vector to at least one training set based on the plurality of distances.

18. The computer-readable of claim 12, wherein the method the further comprises defining a quantum circuit configured to identify a data vector from a set of training set that is associated with an mth smallest distance from a target data, wherein the mth smallest distance is obtained based on the plurality of amplitudes provided by the amplitude estimation circuit.

19. The computer-readable medium of claim 18, wherein the quantum distance circuit produces a median value of a distance.

20. The computer-readable medium of claim 12, wherein the amplitude estimation quantum circuit is defined to include a quantum Fourier transform circuit, a controlled circuit that applies Grover iterations, and an inverse quantum Fourier transform circuit.

21. A quantum computer, comprising:
   a first quantum circuit configured to determine a distance between a target vector and vectors from a set of data vectors, wherein the distance is a Euclidean distance or an inner product;
   a second quantum circuit configured to produce a plurality of quantum states associated with corresponding distance estimates obtained with the first quantum circuit based on amplitude estimation without measurement; and
   a third quantum circuit configured to determine a nearest neighbor distance between the target vector and the vectors of the set of data vectors by selecting a median value based on the plurality of quantum states and the corresponding distance estimates of distances between the target vector and the vectors of the set of data vectors.

* * * * *